United States Patent
Ward et al.

(10) Patent No.: US 11,009,659 B2
(45) Date of Patent: May 18, 2021

(54) OPTICAL MODULATION DEVICE

(71) Applicant: Oclaro Technology Limited, Northamptonshire (GB)

(72) Inventors: Andrew John Ward, Northamptonshire (GB); Neil David Whitbread, Northamptonshire (GB); Stephen Jones, Northamptonshire (GB); Andrew Cannon Carter, Northamptonshire (GB)

(73) Assignee: Lumentum Technology UK Limited, Northamptonshire (GB)

( * ) Notice: Subject to any disclaimer, the term of this patent is extended or adjusted under 35 U.S.C. 154(b) by 0 days.

(21) Appl. No.: 15/775,337

(22) PCT Filed: Aug. 30, 2016

(86) PCT No.: PCT/GB2016/052677
§ 371 (c)(1),
(2) Date: May 10, 2018

(87) PCT Pub. No.: WO2017/085447
PCT Pub. Date: May 26, 2017

(65) Prior Publication Data
US 2018/0329269 A1 Nov. 15, 2018

(30) Foreign Application Priority Data
Nov. 20, 2015 (GB) ..................................... 1520472

(51) Int. Cl.
*G02B 6/125* (2006.01)
*G02B 6/12* (2006.01)
(Continued)

(52) U.S. Cl.
CPC .......... *G02B 6/125* (2013.01); *G02B 6/02204* (2013.01); *G02B 6/12007* (2013.01); *G02B 2006/12142* (2013.01)

(58) Field of Classification Search
CPC .. G02F 1/2255; G02F 1/225; G02F 2001/212; G02B 6/125; G02B 2006/12142
See application file for complete search history.

(56) References Cited

U.S. PATENT DOCUMENTS

| | | | |
|---|---|---|---|
| 7,643,708 B2 * | 1/2010 | Kawano | G02F 1/0121 385/2 |
| 9,081,253 B2 | 7/2015 | Kono | |

(Continued)

FOREIGN PATENT DOCUMENTS

| | | |
|---|---|---|
| CN | 1754121 A | 3/2006 |
| CN | 101364656 A | 2/2009 |

(Continued)

OTHER PUBLICATIONS

Kono et al. machine translation—related to JP-2014112171-A.*

(Continued)

*Primary Examiner* — Ryan A Lepisto
*Assistant Examiner* — Erin D Chiem
(74) *Attorney, Agent, or Firm* — Harrity & Harrity, LLP (57) ABSTRACT

The invention relates to optical modulation devices and, in particular, monolithically integrated optical modulation devices. Disclosed herein is a monolithically integrated optical modulation device (200) that comprises: an input optical port (210); an output optical port (215); and an optical waveguide for guiding light from the input optical port to the output optical port. A portion of the optical waveguide is split into at least two branches. The waveguide is configured to cause a net 180° change in direction of the light while guiding said light from the input optical port to (Continued)

the output optical port such that the input optical port and the output optical port are positioned on a first edge of the device. At least some of the net 180° change in direction is achieved within the branches of the waveguide.

29 Claims, 7 Drawing Sheets

(51) Int. Cl.
  *G02B 6/02* (2006.01)
  *G02F 1/225* (2006.01)

(56) References Cited

U.S. PATENT DOCUMENTS

| | | |
|---|---|---|
| 2004/0240036 A1 | 12/2004 | Porte et al. |
| 2005/0271313 A1* | 12/2005 | Oikawa .................. G02F 1/035 385/3 |
| 2006/0056002 A1 | 3/2006 | Wooten et al. |
| 2010/0119189 A1 | 5/2010 | Nasu et al. |
| 2013/0202312 A1 | 8/2013 | Shen et al. |
| 2014/0169723 A1 | 6/2014 | Kato |
| 2014/0185978 A1 | 7/2014 | Liao et al. |
| 2015/0063809 A1* | 3/2015 | Sugiyama ............... H04J 14/06 398/65 |
| 2016/0085133 A1* | 3/2016 | Denoyer .................. G02B 6/14 385/3 |
| 2016/0363834 A1* | 12/2016 | Velthaus ............... G02F 1/2255 |
| 2017/0163001 A1* | 6/2017 | Evans .................. H01S 5/06256 |

FOREIGN PATENT DOCUMENTS

| | | |
|---|---|---|
| CN | 101868758 A | 10/2010 |
| CN | 104885004 A | 9/2015 |
| EP | 2487524 A1 | 8/2012 |
| JP | 2011-191334 A | 9/2011 |
| JP | 2012163876 A | 8/2012 |
| JP | 2014-112171 A | 6/2014 |
| JP | 2014112219 A | 6/2014 |
| WO | 2009088089 A1 | 7/2009 |
| WO | 2011043079 A1 | 4/2011 |
| WO | 2013018263 A1 | 2/2013 |
| WO | WO 2016/021163 A1 | 2/2016 |

OTHER PUBLICATIONS

Intellectual Property Office of the United Kingdom, Patents Act 1977: Search Report under Section 17(5), Application No. GB1520472.0, dated May 11, 2016, 4 Pages.

Patent Cooperation Treaty, International Search Report and Written Opinion of the International Searching Authority, International Patent Application No. No. PCT/GB2016/052677, dated Nov. 7, 2016, 15 Pages.

* cited by examiner

OPTICAL MODULATION DEVICE

RELATED APPLICATIONS

This application is a 35 U.S.C. 371 national stage filing of International Application No. PCT/GB2016/052677, filed on Aug. 30, 2016, which claims priority from United Kingdom Application No. GB1520472.0 filed on Nov. 20, 2015. The contents of the aforementioned applications are hereby incorporated by reference in their entireties.

TECHNICAL FIELD

The invention relates to optical modulation devices. The invention finds particular application in monolithically integrated optical modulation devices.

BACKGROUND

In this specification, the term "light" will be used in the sense that it is used in optical systems to mean not just visible light, but also electromagnetic radiation having a wavelength outside that of the visible range. Similarly, the terms "beam" and "beam of light" will be used to describe not just beams of visible light, but also electromagnetic radiation having a wavelength outside of the visible range.

In this specification, the terms "downstream" and "upstream" will be used to describe the relative position of components on or in proximity to an optical path. In particular, "downstream" can be construed as "further along an intended optical path in a waveguide", whilst "upstream" can be construed as "earlier on along an intended path in a waveguide".

Typically, optical modulation devices comprise one or more waveguides in which beams of light propagate. Generally, optical modulation devices are configured to modulate beams of light whilst they are propagating through one or more of such waveguides. There are numerous properties of light waves in a beam of light that can be modulated, including phase, amplitude and polarisation. Much of the following document is set out with reference to phase and amplitude modulation devices but it will be appreciated that the general principles described herein may apply to modulation of other properties of light.

Electro-optic modulators, amongst other applications, can be used to modulate the phase of a coherent beam of light. Electro-optic phase modulators generally comprise elements which exhibit an electro-optic effect. Certain crystalline solids such lithium niobate, indium phosphide and gallium arsenide exhibit such an effect. Alloys of certain crystalline solids can also exhibit such an effect. An electro-optic effect occurs when the refractive index of a material varies with respect to an electric field applied to that material. Such variation of the refractive index of a material can be utilised to cause phase modulation of a light wave propagating through the material.

Electro-optic phase modulators generally operate by causing light to pass through a material which exhibits the electro-optic effect (an electro-optic material) and by having a varying electric field permeating through that material. In some instances, the varying electric field can be achieved simply by having the electro-optic material disposed between one or more parallel plate capacitors with variable voltage sources. Effectively, the above described configuration can be used to convert an electrical signal supplied to an electro-optic modulator into an optical phase modulated signal.

Figure 1:
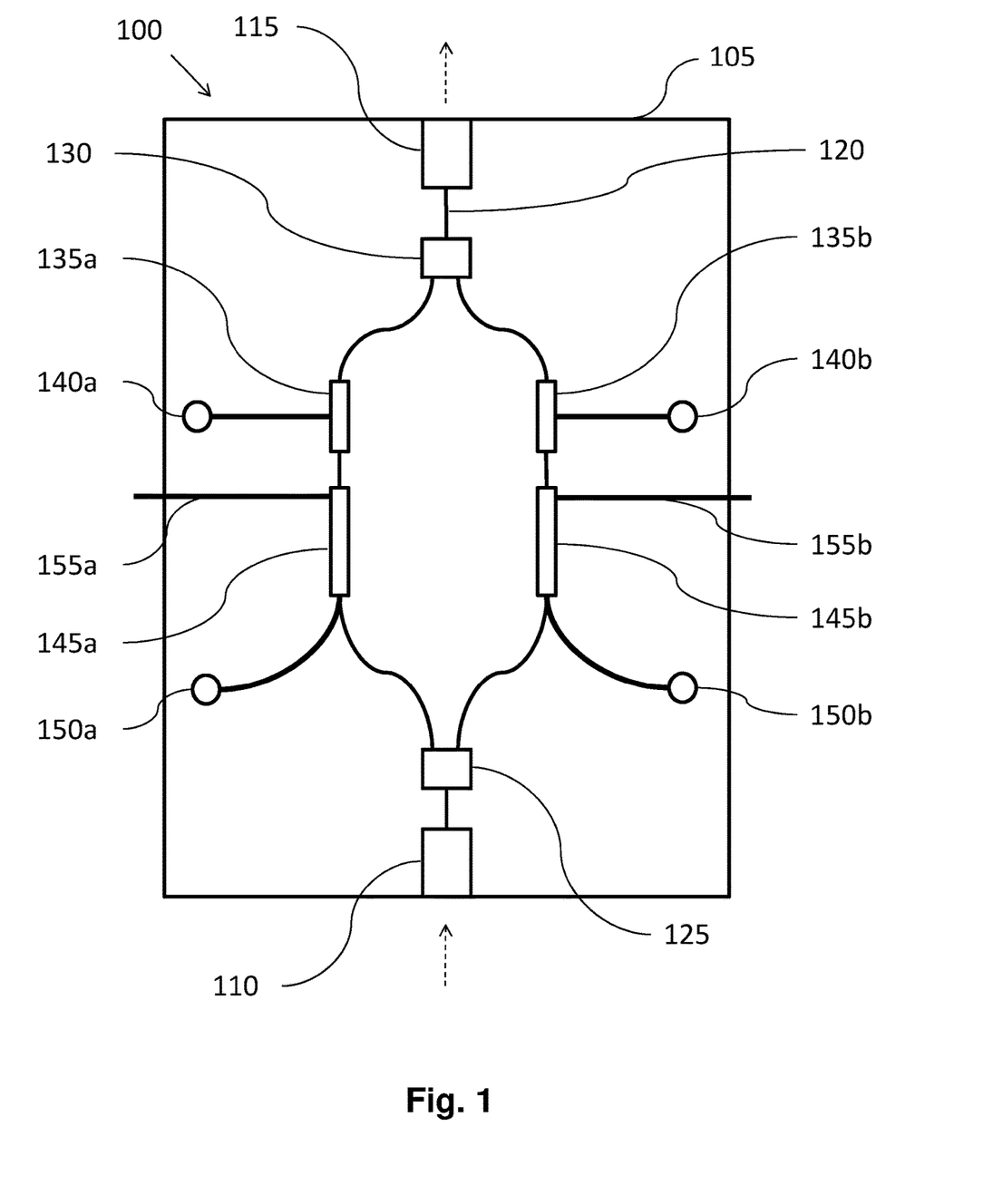
FIG. 1 is a schematic diagram of a conventional optical modulation device.

FIG. 1 displays a conventional optical modulation device 100. This optical modulation device 100, in particular, is an on-off keying (OOK) optical modulation device.

The optical modulation device 100 shown in FIG. 1 is monolithically integrated on a chip comprising a substrate 105. The optical modulation device 100 comprises an input optical port 110 and an output optical port 115. The input optical port 110 and the output optical port 115 are disposed on oppositely facing facets of the device 100. The device 100 further comprises a series of interconnecting waveguides 120, a multimode interference (MMI) splitter 125 and an MMI combiner 130 (although it will be appreciated that other structures such as y-branches could be used in place of MMI splitters and combiners).

Between the splitter 125 and the combiner 130, the device 100 comprises two separate modulation arms. The modulation arms separate at the splitter 125 from a central waveguide originating from the input optical port 110. The modulation arms recombine at the combiner 130 into another central waveguide that feeds into the output optical port 115.

Each modulation arm comprises a waveguide extending from the splitter 125 to combiner 130. Each modulator arm has a direct current (DC) element 135a, 135b associated with and coupled to it. The DC elements 135a, 135b allow for static phase correction of light beams propagating through the modulator arms. Each DC element 135a, 135b is imposed on a portion of the waveguide of its associated modulator arm downstream from the splitter 125. Each DC element 135a, 135b is connected to an associated DC electrical input terminal 140a, 140b coupled to it. The DC electrical input terminals 140a, 140b are disposed adjacent to outwardly facing sidewalls of the optical modulation device 100. The DC electrical input terminals 140a, 140b can be connected to one or more DC sources.

Each modulator arm also has a modulation element 145a, 145b coupled thereto. Each modulation element 145a, 145b is imposed on a portion of the waveguide of its associated modulator arm upstream or downstream from the corresponding DC element 135a, 135b. Each modulation element 145a, 145b has an associated electrical signal input terminal 150a, 150b electrically coupled to one end thereof, which could be considered as an input end. In the example of FIG. 1 the input end is located at the upstream end of the element in the sense of the flow of light through the modulator. The electrical signal 150a, 150b input terminals are disposed adjacent to outwardly facing sidewalls of the optical modulation device 100. The electrical signal input terminals can be connected to one or more electrical sources including drive sources which are often known as "radio frequency (RF)" electrical sources. In the context of the present disclosure it will be understood the "RF" is not restricted to the traditional band of frequencies used for radio transmission, and that drive signals typically contain a broad spectral bandwidth which can range ranging from near to DC up to perhaps 40 GHz or possibly even higher. It will also be appreciated that DC and drive currents may be provided via a single element: separate DC and RF elements are not always required. Each of the modulation elements 145a, 145b also has an associated termination coupling 155a, 155b. The termination couplings 155a, 155b are electrically connected to "output" ends of their associated modulation elements 145a, 145b. The termination couplings 155a, 155b extend to the exterior of the optical modulation device 100.

The termination couplings 155a, 155b can be connected to an external termination unit (e.g. a ground connection). For the purposes of this disclosure, the modulation elements 145a, 145b can be considered to form part of an overall modulation assembly 145 of the optical modulation device 100.

During operation of the optical modulation device 100, a coherent beam of light (represented by the dashed arrow in FIG. 1) is fed into the input optical port 110. The beam propagates along the central waveguide originating from the input optical port 110. When the beam reaches the splitter 125, it is split into two separate coherent beams, approximately of equal intensity. Each beam is directed and propagates along a waveguide of a separate modulator arm of the optical modulation device 100. In combination or separately, the DC elements 135a, 135b and modulation elements 145a, 145b are configured to modulate the phase of the coherent beams of light. In a typical scenario, the DC elements 135a, 135b serve the purpose of maintaining the correct relative phase of light beams propagating through the modulator arms of the optical device 100, whilst the modulation elements 145a, 145b modulate light beams propagating through the modulator arms using RF electrical signals that are input at the electrical signal input terminals 150a, 150b. The termination couplings of the modulation elements 145a, 145b ensure that the RF signals input to the modulation elements 145a, 145b are terminated effectively. The modulated beams are superimposed at the MMI combiner 130, resulting in the final OOK modulated signal. The OOK modulated signal is output at the output optical port 115.

Design criteria for optical components, including optical modulation devices such as the optical modulation device 100 described above, are moving towards smaller size and greater functionality. In general, this has led toward greater integration of components on multi-component optical modules. In particular, increasingly the functionality of optical chips made in materials such as silicon, silicon dioxide, indium phosphide and gallium arsenide has enabled the creation of multi-functional and small optical modules incorporating optical modulators. However, there remain challenges in the creation of such multi-functional and small optical modules: the cost and complexity of assembling, aligning and fixing multiple optical components in a complex optical module remains a challenge. The accurate alignment of optics in multi-component modules may presently take many hours per module.

SUMMARY OF THE INVENTION

The present inventors have appreciated that there is a need for a monolithically integrated optical modulation device that is more practical to install on a multi-component optics module. The present inventors have also appreciated that there is a need for a monolithically integrated optical modulation device that allows for the production of more compact multi-component optical modules.

With conventional monolithically integrated optical modulation devices, such as the optical modulation device 100 shown in FIG. 1, a front facet and a rear facet must be aligned relative to other components when forming part of a multi-component module. In particular, it is of paramount importance that an input optical port and an output optical port of a device are aligned correctly in order to receive and forward optical beams. In addition, DC and RF electrical input terminals of an optical modulation device must be taken into consideration in the design of a multi-component module. Conventional optical modulation devices have DC and RF electrical input terminals positioned on or adjacent to their sidewalls. Side placement of the DC and RF electrical input terminals means that optical modulation devices must be adequately spaced apart from neighbouring devices so as to allow room for the necessary electrical connections on the DC and RF input terminals. The external electrical termination for any RF electrical input terminals of a conventional optical modulation device must also be accounted for when designing a multi-component optical module.

Overall, the inventors have appreciated that installation of monolithically integrated optical modulator devices on multi-component optical modules is complex, expensive and time consuming. Further, the current configuration of monolithically integrated optical modulator devices takes substantial design freedom away from the designers of multi-component optical modules, due to the spacing needed for such devices amongst other considerations.

In accordance with one aspect of the present invention, there is provided a monolithically integrated optical modulation device comprising an input optical port; an output optical port; and an optical waveguide for guiding light from the input optical port to the output optical port. A portion of the optical waveguide is split into at least two branches. The waveguide is configured to cause a net 180° change in direction of the light while guiding said light from the input optical port to the output optical port such that the input optical port and the output optical port are positioned on a first edge of the device. At least some of the net 180° change in direction is achieved within the branches of the waveguide.

The first edge of the integrated device may be a cleaved facet.

Each branch of the waveguide may comprise a net 180° change of direction. At least one of the branches of the optical waveguide may comprise a meander such that the optical path lengths in each of the at least two branches are substantially equal. The at least two branches of the optical waveguide may meander to differing extents such that the optical path lengths in each of the branches are substantially equal.

The device may further comprise one or more modulation elements coupled to one or more respective branches of the waveguide for imparting an optical signal to light in the respective branch.

The device may further comprise one or more electrical signal input tracks coupled to the one or more modulation elements for supplying electrical signals to the one or more modulation elements.

The one or more electrical signal input tracks may extend from a second edge of the device to the one or more modulation elements. The second edge may be positioned opposite to the first edge on the device. The second edge may be a facet of the device.

The one or more electrical signal input tracks may be configured to receive and transmit RF driven electrical signals. Each electrical signal input track may be connected to an input of a corresponding modulation element.

Each modulation element may comprise at least one conductive path having a portion in proximity to a portion of one or more respective branches of the waveguide.

The device may further comprise a resistor electrically coupled to an output of at least one of the one or more modulation elements. The device may further comprise a capacitor electrically coupled to the resistor. The resistor and the capacitor may be configured to provide electrical termination to at least one of the one or more modulation elements within the integrated device.

The one or more modulation elements may be configured to modulate said light to produce a quadrature phase-shift modulated signal or part of a quadrature phase-shift modulated signal. Alternatively, the one or more modulation elements may be configured to modulate said light to produce:

- an amplitude modulated signal or part of an amplitude modulated signal;
- a phase modulated signal or part of a phase modulated signal;
- an amplitude and a phase modulated signal or part of an amplitude and a phase modulated signal; or
- a quadrature amplitude modulated signal or part of a quadrature amplitude modulated signal.

In causing the net 180° change in direction of the light while guiding said light from the input optical port to the output optical port, the waveguide may be configured to cause the light to propagate away from a central lengthwise axis of the device, thereby avoiding a crossover of the waveguide.

In accordance with another aspect of the present invention, there is provided a monolithically integrated optical modulation device comprising: a front edge; and a rear edge. The input optical port and an output optical port are disposed on the front edge. The device further comprises at least one Mach-Zehnder modulator having at least two waveguide branches is provided within the device, the branches independently undergoing a net 180° change of direction between an input and an output of the modulator. The device further comprises at least one signal driver electrical input terminal for providing an electrical signal to the modulator is disposed on the rear edge.

The front edge of the integrated device in accordance with the second aspect of the present invention may be a facet.

In accordance with another aspect of the present invention, there is provided a monolithically integrated optical modulation device comprising: a front edge; and a rear edge. An input optical port and an output optical port are disposed on the front edge, and two or more signal driver electrical input terminals are disposed on the rear edge.

The front edge of the integrated device in accordance with the third aspect of the present invention may be a facet.

In accordance with another aspect of the present invention, there is provided a monolithically integrated optical modulation device comprising: input and output optical ports; an optical waveguide for guiding light from the input optical port to the output optical port; and a modulation assembly for imparting an optical signal to light in the optical waveguide. The modulation assembly comprises: a modulation element coupled to the waveguide; and a termination unit coupled to the modulation element.

The termination unit may comprise a resistor, a capacitor, and an electrical path to ground connected in series. The electrical path to ground may comprise a doped semiconductor, a conductive track and/or a wirebond.

In accordance with another aspect of the present invention, there is provided a chip comprising a side-by-side array of any of the monolithically integrated optical modulation devices described above.

The devices in the array may be arranged side by side with a spatial frequency of 2.5 mm or less, optionally 2 mm or less, and in certain cases optionally 1 mm or less or 0.5 mm or less.

BRIEF DESCRIPTION OF THE DRAWINGS

Exemplary embodiments of the invention will now be described with reference to the accompanying drawings in which.

DETAILED DESCRIPTION

Generally disclosed herein are optical modulation devices that are simple to install. The optical modulation devices disclosed herein allow for the construction of more compact and potentially complex multi-component optical modules.

The optical modulation devices disclosed herein are monolithically integrated and are generally configured to have their optical inputs and optical outputs disposed on a single front-facing edge, which will usually be a cleaved facet. By having an optical input disposed together with an optical output on a single facet of an optical modulation device, only that edge needs to be aligned when the device is installed on a multi-component module. In contrast, conventional optical modulation devices require both their front and rear facing edges to be aligned with respect to neighbouring components to ensure that its optical inputs and outputs can transmit and receive optical signals appropriately. Alignment of an additional facet adds an additional potential source of error in the construction of a multi-component device, which can result in additional time and difficult in constructing the device. Furthermore, if the optical inputs and outputs are both provided on one facet, the opposite edge need not be manufactured to such high tolerances, and/or may not require special coatings to reduce optical loss or reflections.

The optical modulation devices disclosed herein generally comprise internal modulator arms which undergo a net 180° change in direction. In other words, the optical modulator arms bend by approximately 180° inside their respective devices. This feature allows optical inputs and outputs to be co-located on front-facing edges or facets of optical modulation devices. For devices comprising multiple modulator arms, meanders can be incorporated in the modulator arms to ensure that the optical path of each modulator arm is the same.

Modulator arms undergoing a net 180° change in direction can minimise the unwanted effects of optical scattering within an optical modulation device. In particular, the bend in such modulator arms in addition to the input and output ports being located on a single facet assist in maintaining clean output signals. In the exemplary modulator devices disclosed here, output beams are less susceptible to coupling with stray light from waveguides.

The optical modulation devices disclosed herein are also generally configured such that RF input terminals are positioned on or adjacent to rear-facing edges of the devices. In addition, the optical modulation devices comprise on-device termination apparatus in contrast to conventional devices which comprise conductive tracks connecting to external (off-device) termination. Such devices can provide a number of advantages, including enabling close proximity of the RF input terminals to driver integrated circuits. This has particular benefit in more complex modulation devices, and can enable all the modulators in such devices to be driven from a single driver with multiple outputs. Further advantages include shorter and/simpler RF tracking between the driver and modulator chip, simpler RF design within the modulator chip, and higher density of RF elements within the chip. This design also makes arrays of complex modulators within one chip much more feasible.

Exemplary optical modulation devices will now be described with reference to the accompanying drawings.

Reference will be made to front edges and rear edges of monolithically integrated optical modulation devices. The word edge is intended to encompass any side, surface, face or other outwardly facing constituent of an exemplary monolithically integrated optical modulation device. Input and output optical ports may be disposed on and/or incorporated in a front edge of an exemplary monolithically integrated optical modulation device. The skilled person, upon reading the below description, will appreciate that the front edge of an exemplary monolithically integrated optical modulation device may be a front facet of the device. The facet may be, in some instances, a high-grade optical facet in which input and output optical ports are incorporated.

The skilled person, upon reading the below description, will also appreciate that electrical terminals and/or other electrical connection means may be disposed on and/or incorporated in a rear edge of an exemplary monolithically integrated optical modulation device. The rear edge of an exemplary optical modulation device may be, in some instances, a rear facet of the device.

Figure 2:
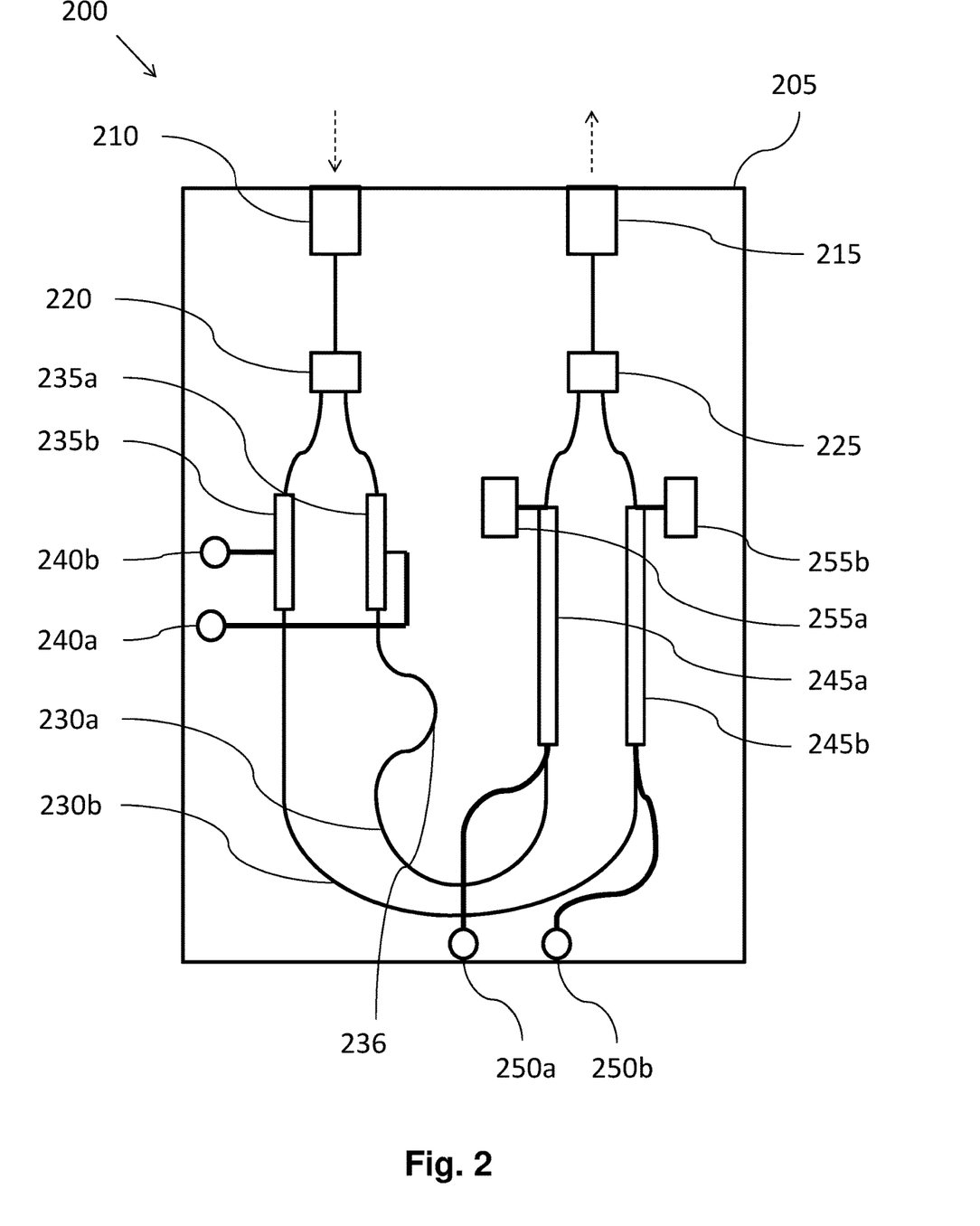
FIG. 2 is a schematic diagram of an exemplary folded OOK optical modulation device.

FIG. 2 is a schematic diagram of an exemplary folded on-off keying (OOK) optical modulation device 200. The optical modulation device 200 is monolithically integrated on a substrate 205. The substrate 205 may consist of silicon and/or other elements or compounds suitable for the formation of monolithically integrated optical components.

The optical modulation device 200 comprises an input optical port 210 positioned on a front edge of the device 200. The optical modulation device 200 comprises an output optical port 215 positioned on the front edge of the device 200. The optical modulation device 200 further comprises a series of interconnecting waveguides. The interconnecting waveguides are configured to guide beams of light from the input optical port 210 to the output optical port 215.

The optical modulation device 200 further comprises a beam splitter 220 and a beam combiner 225. In exemplary optical modulation devices, the beam splitter may be a MMI splitter. In exemplary optical modulation devices, the beam combiner may be a MMI combiner. A waveguide provides an optical path from the input optical port 210 to the beam splitter 220. A waveguide provides an optical path from the beam combiner 225 to the output optical port 215.

The optical modulation device 200 comprises two modulation arms. In particular, the device 200 comprises an inner modulation arm 230a and an outer modulation arm 230b. "Inner" and "outer" herein are referred to with respect to the centre of the device 200. Similar reference to "inner" and "outer" will be made hereinafter with respect to other described exemplary optical modulation devices. Each of the modulator arms is connected to the beam splitter 220 and the beam combiner 225. Each modulator arm 230a, 230b provides an optical path from the beam splitter 220 to the beam combiner 225.

Each of the inner and outer modulation arms 230a, 230b comprises a DC element 235a, 235b. The DC elements 235a, 235b are positioned downstream from the beam splitter 220. The DC elements 235a, 235b are imposed on and coupled to the waveguides of their respective modulator arms 230a, 230b. In this exemplary device 200, the DC elements are positioned on substantially straight portions of the waveguides of the modulator arms 230a, 230b. The DC elements 235a, 235b are placed at equivalent positions on the modulator arms 230a, 230b. Each DC element 235a, 235b has its own associated DC electrical input terminal 240a, 240b. In other exemplary optical modulation devices, DC elements may have associated more than one DC electrical input terminal. Each DC element 235a, 235b is connected to its associated DC electrical input terminal 240a, 240b by a conductive track. The DC electrical input terminals 240a, 240b are disposed externally on a side edge of the optical modulation device 200. The DC electrical input terminals 240a, 240b can be connected to one or more DC sources. Other exemplary optical modulation devices may comprise additional DC elements. In these other exemplary optical modulation devices, the DC elements may be coupled to other portions of waveguides of modulator arms.

Each of the inner and outer modulation arms 230a, 230b comprises a 180° net change in direction or "bend" in their respective waveguides. In this exemplary optical modulation device 200, the bends occur downstream from the DC elements 235a, 235b. The bends in the waveguides are configured to reverse the direction of light entering the input optical port 210 such that the light is directed back towards the front edge of the device 200. The bend in the waveguides therefore is configured to cause a net 180° change in direction between light entering and leaving the optical modulation device 200.

The inner modulation arm 230a further comprises a meander 236 in its respective waveguide. The meander 236 is positioned on a portion of the modulation arm's waveguide immediately preceding a 180° bend in the waveguide. The purpose of the meander 236 is to ensure that the optical path length of each of the modulator arms 230a, 230b remains the same, despite their 180° net bend. Without the meander 236, the inner modulator arm 230a would have a substantially shorter optical path length than the outer modulator arm 230b. By configuring the waveguides of the modulator arms 230a, 230b such that the optical path lengths are substantially equal, less demand is placed on the DC elements to ensure that the beams propagating through the modulator arms 230a, 230b are superimposed at the correct relative phases and with minimal time delay between the two beams, at the beam combiner 225. This is particularly advantageous if the device is used over a large wavelength range. In other exemplary optical modulation devices, the meander of the waveguide of an inner modulation arm may be positioned at different points along the length of the modulator arm. In some exemplary devices, one or more meanders may be present on both inner and outer modulation arms. The meanders and bends may be superposed on one another: in FIG. 2 the meander and 180° bend are shown as separate entities, but it will be appreciated that they need not be separate sections, as long as the overall result is an overall 180° change in direction with an addition meander to ensure the optical path lengths of both arms are the same.

Each of the inner and outer modulation arms 230a, 230b has coupled thereto a modulation element 245a, 245b. In this exemplary optical modulation device, the modulation elements 245a, 245b are RF modulation elements. That is, the modulation elements 245a, 245b are configured to utilise an RF electrical signal to modulate the phase of coherent beams of light propagating through the waveguides of the modulator arms 230a, 230b. As discussed above, in this context, an "RF electrical signal" may comprise a broadband signal from close to DC up to 40 or 50 GHz or even higher. Typically, the modulation elements 245a, 245b comprise a series of parallel plate capacitors and other components connected via conductive paths. The components of the modulation elements 245a, 245b are configured to cause varying electric fields to permeate through portions of the waveguide of their respective modulation arm. The modulation elements 245a, 245b are imposed on substantially straight portions of the waveguides of their respective modulation arms 230a, 230b following the 180° net bend in the waveguides. The modulation elements 245a, 245b are placed at equivalent positions on the modulator arms 230a, 230b. For the purposes of this disclosure, the modulation elements 245a, 245b can be considered to form part of an overall modulation assembly 245 of the device 200.

Each modulation element 245a, 245b has its own associated electrical input terminal 250a, 250b. An input of each modulation element 245a, 245b is connected to its associated electrical input terminal 250a, 250b by an electrical signal input track. In this exemplary optical modulation device 200, the electrical input terminals 250a, 250b are configured to receive RF electrical signals from one or more RF electrical sources (external to the device 200). In other exemplary devices, each modulation element may comprise or have numerous associated electrical input terminals and the modulation elements may be configured to receive RF or other electrical signals from numerous sources.

In this exemplary device 200, the electrical input terminals 250a, 250b are positioned externally at (on or adjacent to) a rear edge of the optical modulation device. The positioning of the electrical input terminals 250a, 250b allows for simpler installation of the device 200 on a multi-component module. Further, by having the electrical input terminals 250a, 250b positioned on the rear edge, the conductive tracks connecting inputs of the modulation elements 245a, 245b to their respective electrical input terminals 250a, 250b can be shorter than if the electrical input terminals were disposed on the sidewalls or edges of the device 200.

The modulation elements 245a, 245b are also electrically coupled to respective termination units 255a, 255b. The termination units 255a, 255b are electrically connected to outputs of their associated modulation elements 245a, 245b. The termination units 255a, 255b are positioned internally within the optical modulation device 200. The termination units 255a, 255b are configured to minimise the reflection of RF energy supplied to the modulation elements 245a, 245b back into the modulation elements 245a, 245b. The inventors have appreciated, due to the 180° net bend in the waveguides and for the purpose of simplifying installation of the optical modulation device, that "on-chip" or "on-device" termination units can be utilized in the optical modulation devices. Exemplary on-device termination units will be described in more detail below with reference to FIG. 3.

The beam combiner 225 of the optical modulation device is configured to superimpose modulated beams arriving from the waveguides of the inner and outer modulator arms 230a, 230b. The beam combiner 225 is then configured to direct the superimposed beam along a waveguide to the output optical port 215 where the final OOK modulated beam can be output.

With reference to FIG. 2, the skilled person will appreciate that there are numerous adaptations that can be made to the optical modulation device 200 shown. In particular, the skilled person will appreciate that modulation elements may, in some exemplary optical modulation devices, be imposed on waveguides of modulator arms as they bend by 180°. The skilled person will also appreciate that DC elements may be placed at different points on modulator arms of other exemplary optical modulation devices. More than one DC element may be present for each modulator arm in some exemplary optical modulation devices. Accordingly, electrical input terminals of DC elements may be placed on different sidewalls/edges or front or rear edges of other exemplary optical modulation devices. DC elements and modulation elements may be incorporated into the same electrode and need not be separate entities imposed on the modulator arms.

Figure 3:
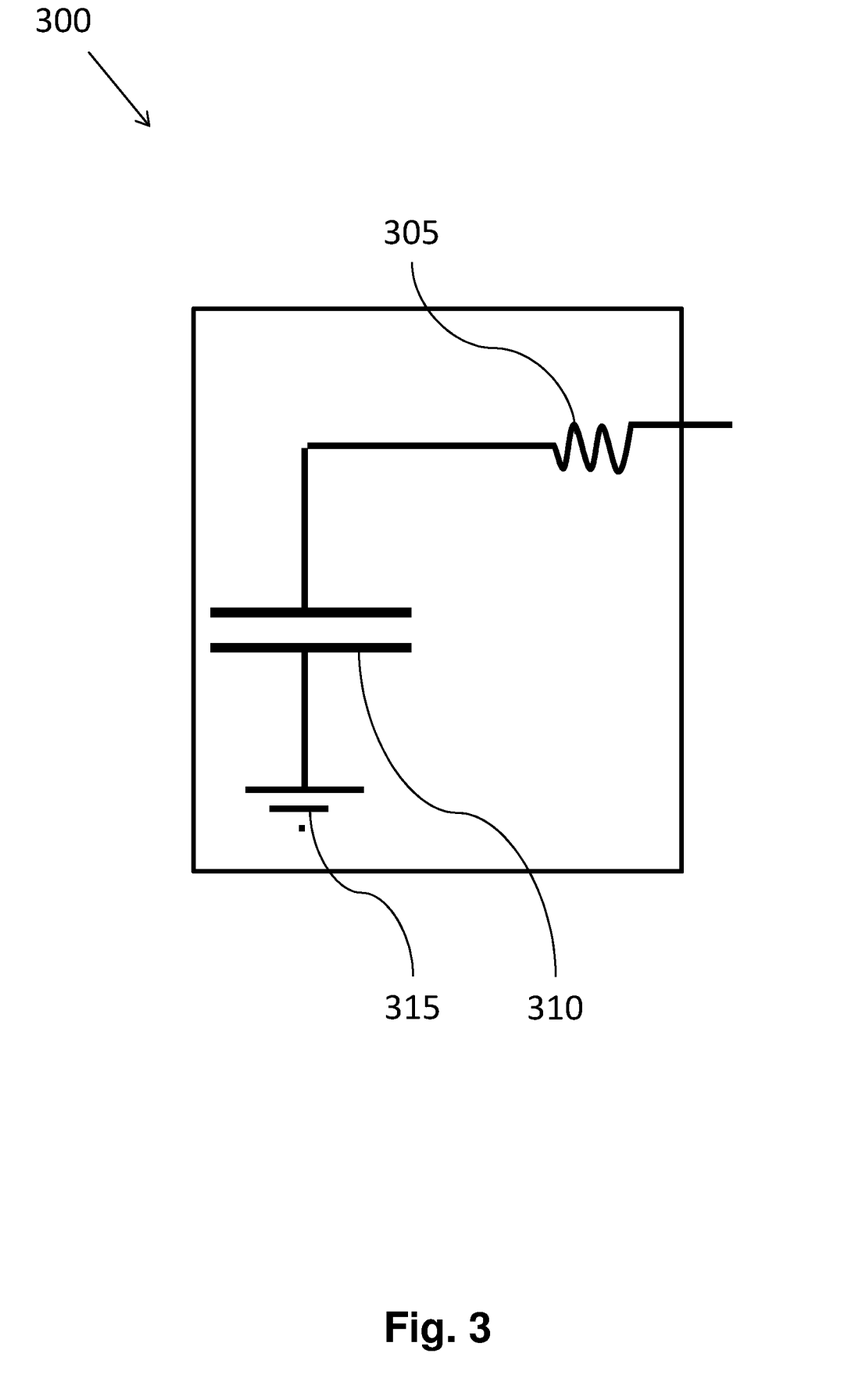
FIG. 3 is a schematic diagram of an exemplary on-device termination unit.

FIG. 3 is a schematic diagram of an exemplary on-device termination unit 300. The on-device termination unit 300 is equivalent to the on-device termination units 255a, 255b forming part of the exemplary optical modulation device 200 shown in FIG. 2.

The termination unit 300 comprises a circuit made up of: a resistor 305, a capacitor 310 and an electrical path to ground 315. The resistor 305, capacitor 310 and ground 315 are connected in series. The resistor 305 is configured to be electrically connected to an output of a modulation element, such as one of the modulation elements 245a, 245b forming part of the exemplary optical modulation device 200 shown in FIG. 2. Typically, the resistor 305 will be electrically connected to the end of a conductive track of a modulation element. Another side of the resistor 305 is electrically connected to a first plate of the capacitor 310. A second plate of the capacitor 310 is electrically connected to ground 315 either directly with a wirebond, or through an additional portion of conductive material, such as a doped semiconductor, or through a combination of both.

The termination unit 300 is configured to replace or supplement "off-chip" or "off-device" termination which is normally used with monolithically integrated optical modulation devices. In the exemplary optical modulation device 200, the 180° bend in the waveguides of the modulator arms 230a, 230b may make off-device termination of the modulation elements 245a, 245b impractical. In particular, off-device termination for modulation element 245a would be impractical due to its position close to the centre of the device 200. Off-device termination for element 245a, in particular, would require the use of long wire-bonds with unavoidably high inductance. Such unavoidably high inductance would impede precise modulation of optical beams by the modulation elements 245a, 245b. The inventors have appreciated that the combination of the resistor 305 and the capacitor 310 (and the provision of a connection to ground) minimises the reflection of RF energy from modulator arms back into those modulation arms. Moreover, even if the on-chip termination 300 is limited, perhaps because the maximum practical size for an on-chip capacitor 310 is too small to give perfect termination, the on-chip termination 300 is still advantageous because even a small capacitor 310 can effectively compensate for the inductive impairment of the long wirebond to ground. In other exemplary termination units, an external capacitor may be interposed between an internal capacitor of a termination unit and an electrical path connecting the internal capacitor to ground. In addition, or alternatively, an internal capacitor of a termination unit may be connected to an external bias or drain (through an external capacitor or otherwise).

Figure 4:
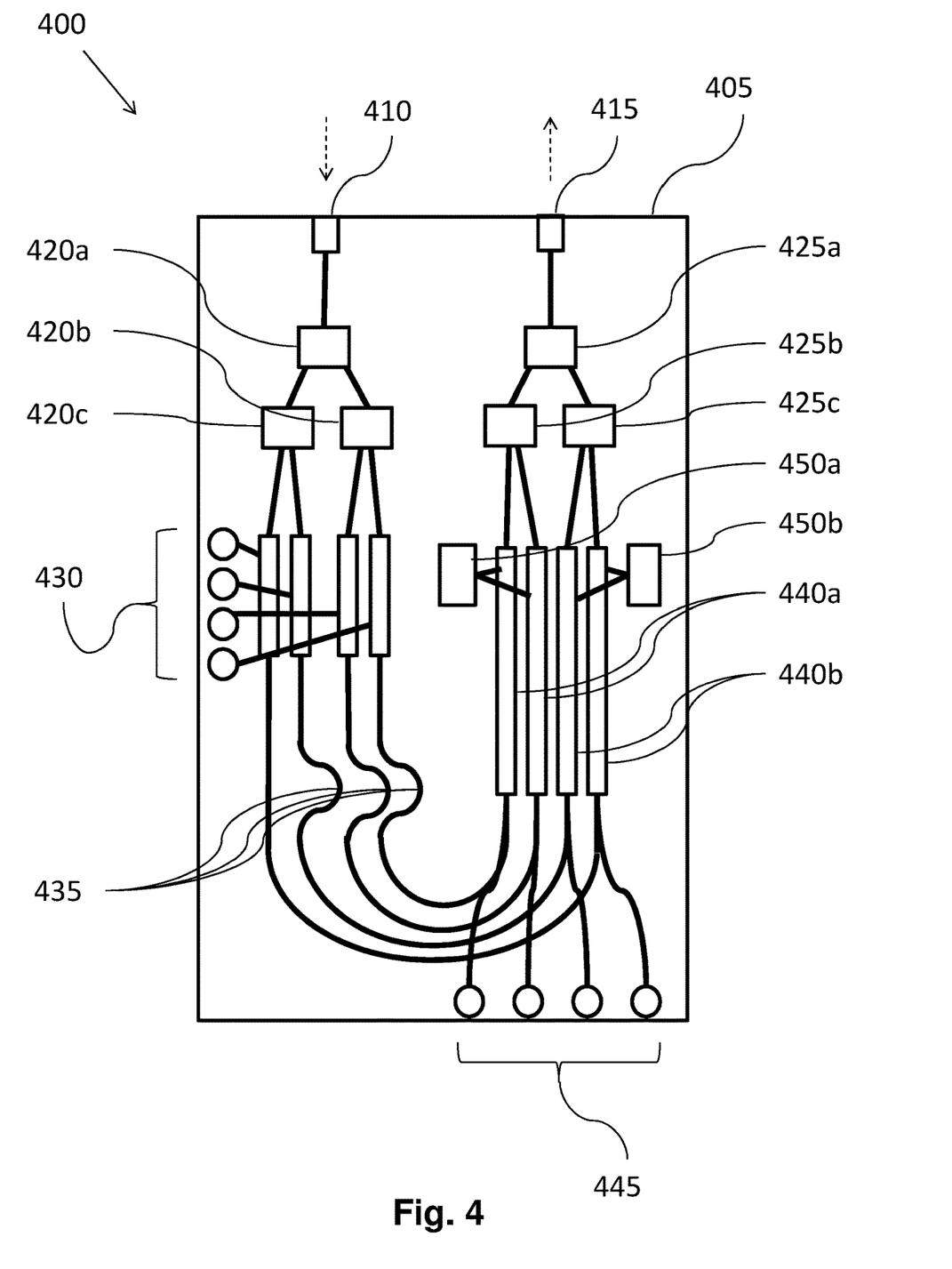
FIG. 4 is a schematic diagram of an exemplary folded quadrature phase shift keying (QPSK) optical modulation device.

FIG. 4 is a schematic diagram of an exemplary folded Quadrature Phase Shift Keying (QPSK) optical modulation device 400. The optical modulation device 400 has a similar configuration to the folded OOK optical modulation device 200 shown in FIG. 2. The optical modulation device 400 is monolithically integrated on a substrate 405. The optical modulation device also comprises an input optical port 410 and an output optical port 415. A series of waveguides within the optical modulation device 400 guide light entering the input optical port 410 to the output optical port 415. However, unlike the exemplary folded OOK optical modulation device 200, this folded QSPK optical modulation device 400 comprises 4 modulator arms, rather than two.

The optical modulation device 400 further comprises three beam splitters 420a, 420b, 420c and three beam combiners 425a, 425b, 425c. An initial beam splitter 420a is configured to split an incoming light beam from the input optical port 410 into two beams and direct each of these beams into secondary beam splitters 420b, 420c. The secondary beam splitters 420b, 420c are configured to split the subsequent beams in two once more. The arrangement of the beam splitters 420a, 420b, 420c is configured to cause substantially equal portions of an original beam of light to enter each of the modulation arms of the device 400. Similarly, the arrangement of the beam combiners 425a, 425b, 425c is configured to superimpose modulated beams of light from each of the modulation arms into a final QPSK modulated optical signal. The final QPSK modulated signal can then be guided to the output optical port 415.

DC elements 430 of the optical modulation device are positioned downstream from the beam splitters 420a, 420b, 420c. Each of the modulation arms has an associated DC element imposed on and coupled to its waveguide. The DC elements 430 each have an associated DC electrical input terminal in electrical communication to it. The DC electrical input terminals are positioned on an externally facing sidewall or edge of the optical modulation device 400.

As with the exemplary folded OOK optical modulation device 200 shown in FIG. 2, each of the modulation arms of the optical modulation device 400 comprise a 180° net bend in their respective waveguides. So that there is no variation in the optical path length between modulator arms, the three innermost modulator arms comprise meanders in their respective waveguides. In the example shown, the meanders 435 are positioned immediately upstream of a 180° bend in the respective waveguides, although it will be appreciated that this arrangement is exemplary and the 180° bends and meanders can be re-ordered and/or superposed. The meanders 435 of each of the waveguides of the modulator arms are to different extents: the net result should be that each modulator arm as the same optical path length. The waveguide of the innermost modulator arm meanders to the greatest extent, followed by the waveguide of the second innermost modulator arm, followed by the third innermost modulator arm.

Modulation elements 440a, 440b of the optical modulation device are positioned downstream from the 180° net bend in the waveguides of the modulation arms. Each of modulation arms has an associated modulation element 440a, 440b imposed on and coupled to its waveguide. Each of the modulation elements 440a, 440b has an associated electrical input terminal in electrical communication with it. The electrical input terminals 445 are positioned externally on a rear edge of the optical modulation device. For the purposes of this disclosure, the modulation elements 440a, 440b can be considered to form part of an overall modulation assembly 440 of the optical modulation device 400.

The two innermost modulation elements 440a which form part of the two innermost modulator arms are electrically coupled to an on-device termination unit 450a. The termination unit 450a is electrically coupled to outputs of the two innermost modulation elements 440a. The two outermost modulation elements 440b which form part of the two outermost modulator arms are electrically coupled to another on-device termination unit 450b. The termination unit 450b is electrically coupled to outputs of the two outermost modulation elements 440b. In other exemplary optical modulation devices, one on-device termination unit may be configured to provide on-device or "on-chip" termination to all modulation elements. In other exemplary optical modulation devices on-device or "on-chip" termination units may be electrically coupled to one another.

In this exemplary QPSK optical modulation device 400, the two innermost modulator arms and their associated modulation elements 440a in combination with the beam combiner 425b are configured to produce in-phase components of QPSK modulated signals. The two outermost modulator arms and their associated modulation elements 440b in combination with the beam combiner 425c are configured to produce quadrature components of QPSK modulated signals. It is intended that the superimposing of the in-phase and quadrature components will result in final QPSK modulated optical signals being combined by the beam combiner 425a. Final QPSK modulated optical signals can then be output at the output optical port 410.

Figure 5:
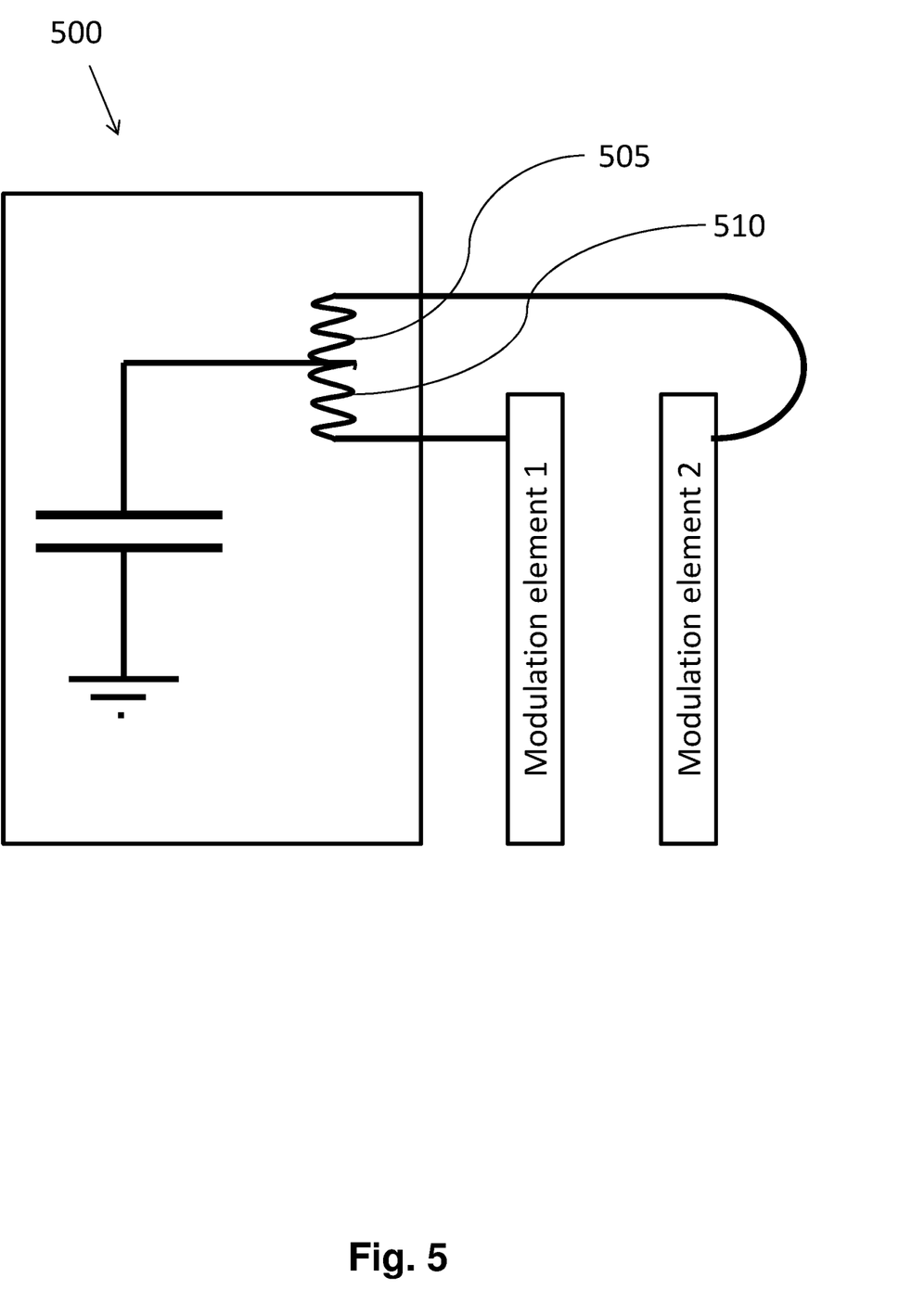
FIG. 5 is a schematic diagram of another exemplary on-device termination unit.

FIG. 5 is a schematic diagram of another exemplary on-device termination unit 500. The termination unit 500 has a similar configuration to the exemplary on-device termination unit 300 shown in FIG. 3. This termination unit 500 differs in that it comprises two resistors 505, 510. A first resistor 505 is configured to be electrically coupled to an output of a first modulation element (as shown). A second resistor 510 is configured to be electrically coupled to an output of a second modulation element (as shown). The resistors, through conductive tracks are then connected to a capacitor. Therefore, the termination unit 500 is configured to provide electrical termination to two separate modulation elements simultaneously. This termination unit 500 is suitable for applications where the two modulation arms are being driven differentially.

The termination unit 500 finds application in the exemplary folded QPSK optical modulation device 400 shown in FIG. 4. That is, the termination unit 500 is equivalent to the termination units 450a, 450b incorporated in the exemplary folded QPSK optical modulation device 400. In some exemplary optical modulation devices, the capacitor of the termination unit may be connected to an additional external capacitor. In addition, or alternatively, the capacitor of the termination unit 500 may be connected to an external bias or drain (through the external capacitor or otherwise). In addition, or alternatively, the capacitor of the termination unit 500 may be connected to an electrical path to ground (through an external capacitor or otherwise).

It will also be appreciated that termination unit 500 could be used in combination with optical modulation device 200 and that termination unit 300 could be used in combination with folded QPSK optical modulation device 400 or folded dual-polarisation QPSK optical modulation device 600. However, it is advantageous to use termination unit 500 in combination with folded QPSK optical modulation device 400 or folded dual-polarisation QPSK optical modulation device 600 because the termination unit 500 is more compact and uses fewer on-chip components than two termination unit 300. This advantage becomes more pronounced as the number of modulation elements on any given chip increases.

Figure 6:
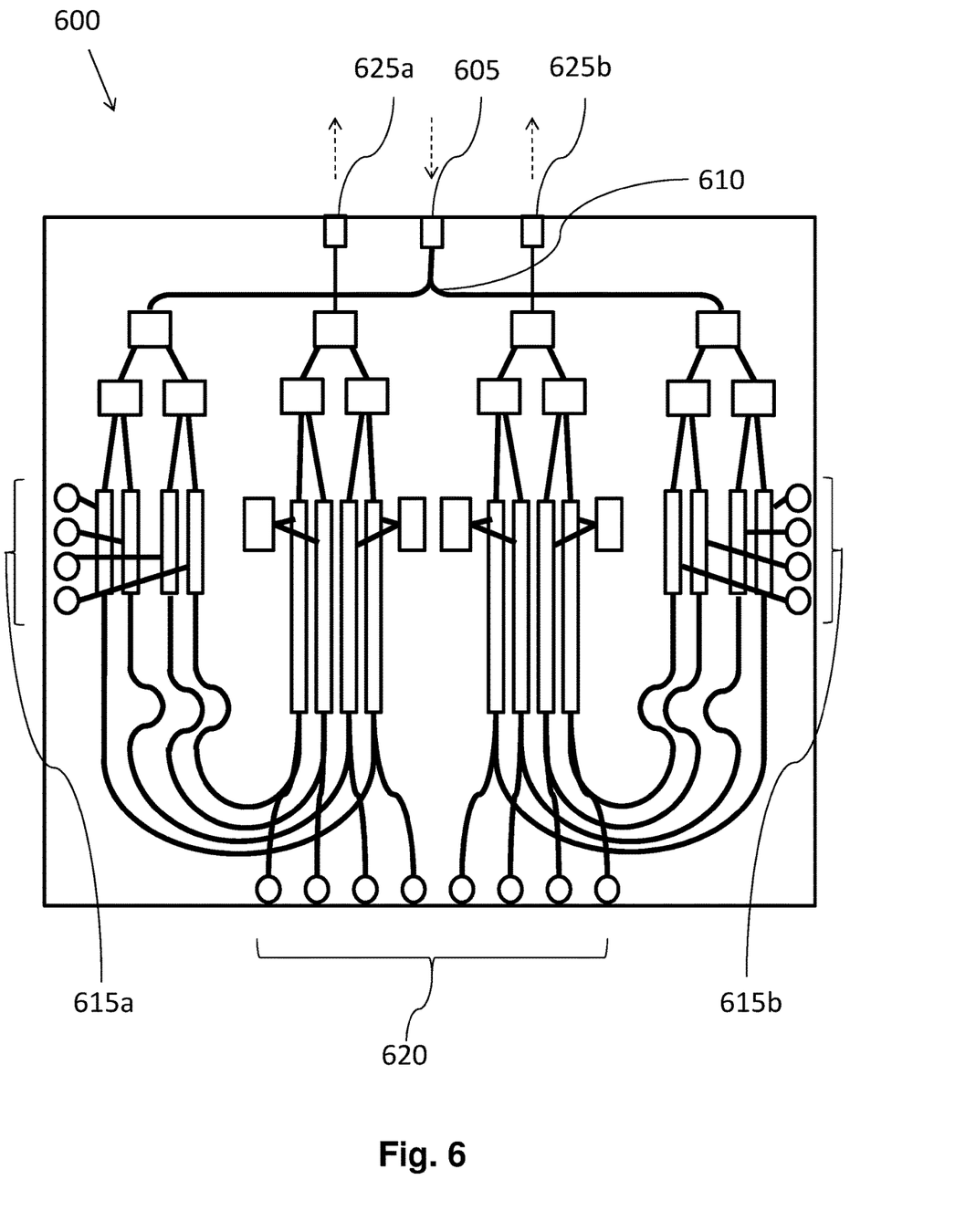
FIG. 6 is a schematic diagram of an exemplary folded dual-polarisation QPSK optical modulation device.

FIG. 6 is a schematic diagram of an exemplary folded dual-polarisation QPSK optical modulation device 600. The device 600 comprises two folded single-polarisation QPSK optical modulators devices of similar configuration to the exemplary folded QPSK optical modulation device 400 shown in FIG. 4. However, the device 400 comprises a single input optical port 605 into which a coherent polarised beam of light can be input to the device 600. The device 600 further comprises a power splitter 610 configured to split light waves from the input optical port 605 between the two QPSK modulators.

The width of exemplary folded dual-polarisation QPSK optical modulation devices such as the one shown in FIG. 6 may be less than 2.5 millimetres. For other exemplary folded dual-polarisation QPSK optical modulation devices, the width may be less than 2 mm. An array of two such devices as referred to previously may have a width of less than 5 mm or less than 4 mm.

The two single-polarisation QPSK optical modulators each have four modulation arms which bend 180° so as to redirect light beams to back to a front edge of the device 600. The three innermost modulator arms of each of the single-polarisation QPSK optical modulators comprise waveguides which meander to maintain consistent optical path length between all of the modulator arms of the device 600. Again, it will be appreciated that all of the arms may include meanders, and the meanders and 180° bends may be superposed.

DC electrical inputs 615a, 615b are positioned externally on sidewalls or edges of the device 600. Electrical signal inputs 620 for modulation elements of the device 600 are positioned on a rear edge of the device 600. For the purposes of this disclosure, the modulation elements can be considered to form an overall modulation assembly of the device 600. The two single-polarisation QPSK optical modulators are configured to direct beams of modulated light to separate output optical ports 625a, 625b co-located with the input optical port 605 on a front edge of the device 600. The polarisation of one of the beams is rotated through 90° following output from the device (although it will be appreciated that a polarisation rotator could be fabricated on the chip).

Figure 7:
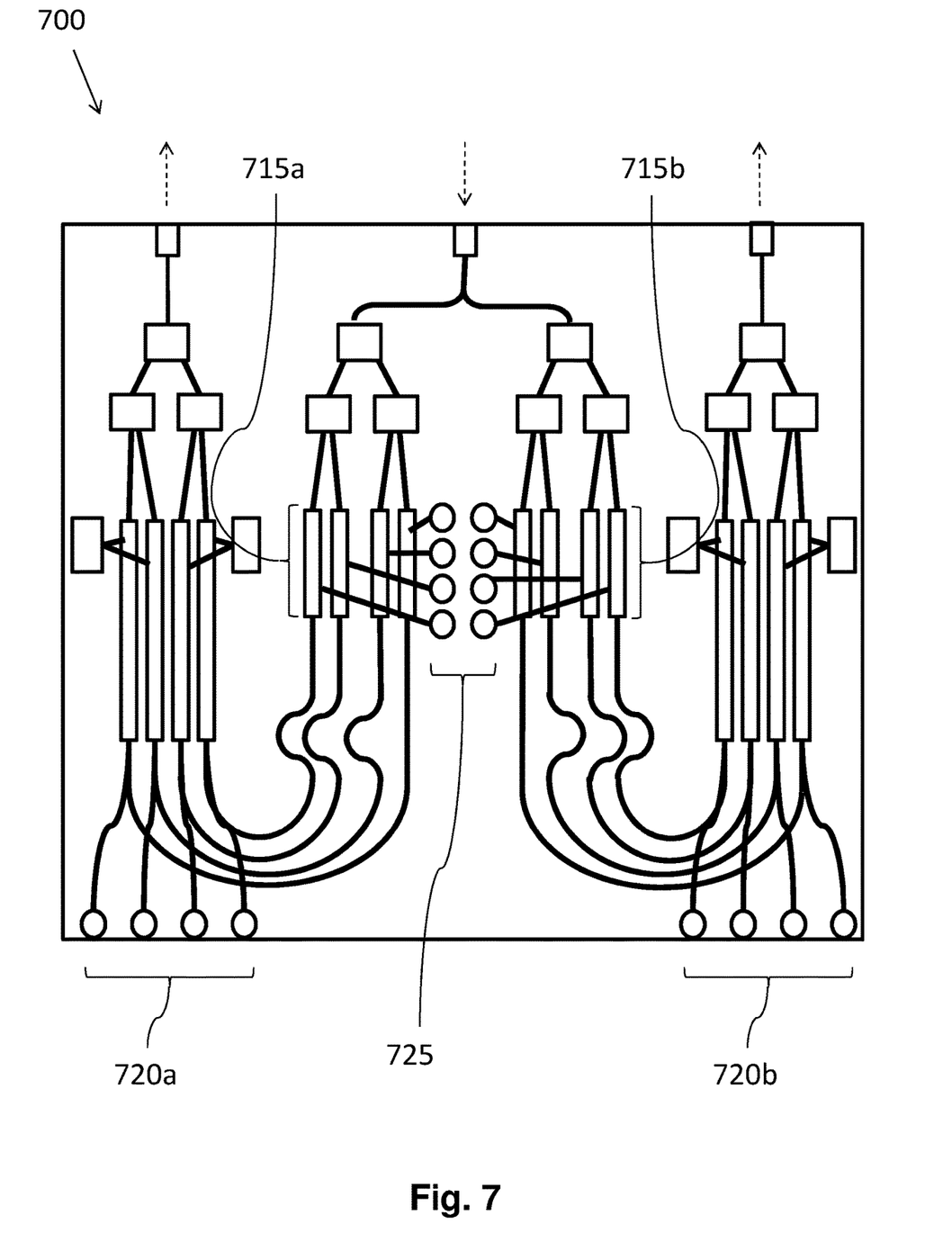
FIG. 7 is schematic diagram of an alternative exemplary folded dual-polarisation QPSK optical modulation device.

A further schematic design of an alternative exemplary folded dual-polarisation QPSK optical modulation device 700 is shown in FIG. 7. This is similar to the arrangement shown in FIG. 6, except that the RF elements (and thus signal inputs 720a, 720b) are positioned towards the left and right edges of the chip, and the DC elements 715a, 715b are at the centre. This has the advantage that it removes waveguide crossings, and may reduce the need for on-chip termination. It has the potential disadvantage that optical ports would be more widely spaced and the signal input ports 720a, 720b are moved apart. Essentially, waveguide crossings are avoided by the branches of the waveguide being configured to turn light propagating through them away from a central axis of the device. The axis referred to is substantially perpendicular to the front and rear edges of the device and extends from the front to the rear of the device.

In the exemplary folded dual-polarisation QPSK optical modulation device 700, the electrical input terminals 725 of the DC elements 715a, 715b are disposed in the centre of the integrated device 700. The electrical input terminals may be configured to connect to circuitry external to the device 700 via one or more controlled collapse connections (also known as a flip chip connections). In other exemplary devices, electrical input terminals may be positioned within the interior of the bend of one or more waveguide.

In other exemplary devices, DC electrical input terminals may be disposed on front or rear edges of the devices. Alternatively, or in addition, DC electrical input terminals may remain disposed on sidewalls of the devices, such as in the exemplary device 600 shown in FIG. 6. However, the placement and use of controlled collapse connections for the DC electrical input terminals can result in less crossing of a waveguide by conductive tracks. Therefore, use of controlled collapse connections for DC electrical input connections may be favourable in some circumstances.

Other exemplary folded dual-polarisation QPSK optical modulation devices may comprise two input optical ports and two output optical ports disposed on their front facing edge. In such exemplary devices, there would be no requirement for a beam splitter, such as the beam splitter 610 of the device 600 shown in FIG. 6. If required, a beam splitter could be provided externally to an exemplary folded dual-polarisation QPSK optical modulation device.

As previously discussed, the arrangements disclosed above facilitate the manufacture of closely packed devices in an array. For example, a side-by-side array of monolithically integrated optical modulation devices as described herein may be disposed on an optical chip. The optical modulation devices may be arranged in an array such that their front edges and rear edges align in the array. The sidewalls or side edges of each device may be positioned adjacent to and parallel with sidewalls or side edges of adjacent devices in the array.

The optical modulation devices disclosed herein are advantageous for use in an array, since they can be positioned together in closer proximity than conventional optical modulation devices. In part, this is due to the positioning of the RF input terminals at the rear-facing edges of the devices, rather than on sidewalls or side edges of the devices. Such an arrangement means that fewer or no electrical connections need be formed on the sidewalls or side edges of the devices. Spacing allowances for electrical connections on the sides of the devices can therefore be reduced or eliminated altogether.

The optical modulation devices disclosed herein allow for a side-by-side array of monolithically integrated optical modulation devices to be formed with a width that is less than the width of an array formed from the same number of conventional optical modulation devices. The width of an array in the context of this disclosure refers to the distance between the outwardly facing sidewalls or side edges of the two outermost optical modulation devices in the array. In practice, since there is no requirement for RF contacts at the side of each device, the only limiting factor in the width of each device in an array is the combined widths of the RF contact pads at the back of each device. In an exemplary device each individual RF contact may have a contact width of 250 μm. So for a D-QPSK device of the type shown in FIGS. 6 and 7, a single device (having eight contact pads 620,720a,720b) may be as small as 2 mm in width. In practice it may be slightly larger, but it is realistic to produce a side by side array of devices having a spatial frequency of 2.5 mm or even 2 mm. For devices of the type shown in FIG. 3 the spatial frequency of an array of devices may be as small as 1 mm, and an array of devices of the type shown in FIG. 2 may have a spatial frequency of around 0.5 mm.

An array of optical lenses may be disposed on the optical chip adjacent to an array of integrated optical modulation devices. The array of lenses may be arranged so that they align with optical input and/or output ports on front-facing edges of the optical modulation devices. Using arrays of integrated optical modulation devices and lenses as described above is advantageous as it obviates the need for individual device-lens alignment on an optical chip. Instead, lenses and devices may be aligned collectively as part of their respective arrays.

Other components such as arrays of DC or RF driver circuitry may be positioned adjacent to rear-facing edges of the optical modulation devices. The driver circuitry may connect to DC and/or RF electrical input terminals of the respective optical modulation devices. The driver circuitry may connect to DC and/or RF electrical input terminals positioned on rear-facing edges of the respective optical modulation devices.

Although the invention has been described in terms of embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. For example, where flip chip bonding is used the DC connections need not be provided at the side of the chip for wire bonding.

It will also be appreciated that those skilled in the art will be able to integrate additional elements and/or components with the embodiments described above. For example, the devices described above may be combined with elements such as monitor photodiodes, semiconductor optical amplifiers and/or lasers. Features such as waveguide loop throughs or other test features for on wafer or bar level assessment could also be beneficially included.

Each feature disclosed or illustrated in the present specification may be incorporated in the invention, whether alone or in any appropriate combination with any other feature disclosed or illustrated herein.

The invention claimed is:

1. A monolithically integrated optical modulation device comprising:
   a single substrate including a front edge, a rear edge, and a side edge;
   an input optical port;
   an output optical port;
   an optical waveguide for guiding light from the input optical port to the output optical port, wherein a portion of the optical waveguide is split into at least two branches,
      wherein the optical waveguide is configured to cause a net 180° change in direction of the light while guiding the light from the input optical port to the output optical port such that the input optical port and the output optical port are positioned on the front edge, and
      wherein at least some of the net 180° change in direction is achieved within the at least two branches of the optical waveguide;
   an on-chip termination unit coupled to at least one branch of the at least two branches,
      the on-chip termination unit including a resistor,
   at least one direct current (DC) electrical input terminal, disposed on the side edge, that connects to at least one branch of the at least two branches; and
   at least one electrical input terminal, disposed on the rear edge, for providing a radio frequency (RF) electrical signal to at least one branch of the at least two branches; and
   the input optical port, the output optical port, the optical waveguide, and the on-chip termination unit, the at least one DC electrical input terminal, and the at least one electrical input terminal being monolithically integrated on the single substrate.

2. The monolithically integrated optical modulation device of claim 1, wherein each branch, of the at least two branches, comprises a net 180° change of direction.

3. The monolithically integrated optical modulation device of claim 1, wherein at least one branch of the at least two branches of the optical waveguide comprises a meander such that optical path lengths in each of the at least two branches are substantially equal.

4. The monolithically integrated optical modulation device of claim 1, wherein the at least two branches of the optical waveguide meander to differing extents such that optical path lengths in each of the at least two branches are substantially equal.

5. The monolithically integrated optical modulation device of claim 1, wherein the front edge is a facet.

6. The monolithically integrated optical modulation device of claim 1, further comprising one or more modulation elements coupled to one or more respective branches of the optical waveguide for imparting an optical signal to light in a respective branch.

7. The monolithically integrated optical modulation device of claim 6, further comprising one or more electrical signal input tracks coupled to the one or more modulation elements for supplying electrical signals to the one or more modulation elements.

8. The monolithically integrated optical modulation device of claim 7, wherein the one or more electrical signal input tracks extend from the at least one electrical input terminal to the one or more modulation elements.

9. The monolithically integrated optical modulation device of claim 7, wherein the one or more electrical signal input tracks are configured to receive and transmit the RF electrical signal.

10. The monolithically integrated optical modulation device of claim 7, wherein each electrical signal input track is connected to an input of a corresponding modulation element.

11. The monolithically integrated optical modulation device of claim 6, wherein each modulation element, of the one or more modulation elements, comprises at least one conductive path having a portion in proximity to a portion of one or more respective branches of the optical waveguide.

12. The monolithically integrated optical modulation device of claim 6, wherein the resistor is electrically coupled to an output of at least one of the one or more modulation elements.

13. The monolithically integrated optical modulation device of claim 12, wherein the on-chip termination unit includes a capacitor electrically coupled to the resistor.

14. The monolithically integrated optical modulation device of claim 13, wherein the resistor and the capacitor are configured to provide electrical termination to at least one of the one or more modulation elements within the monolithically integrated optical modulation device.

15. The monolithically integrated optical modulation device of claim 1, wherein the rear edge is positioned opposite to the front edge on the monolithically integrated optical modulation device.

16. The monolithically integrated optical modulation device of claim 1, further comprising:
   one or more modulation elements configured to modulate the light to produce a quadrature phase-shift modulated signal or part of a quadrature phase-shift modulated signal.

17. The monolithically integrated optical modulation device of claim 1 further comprising:
one or more modulation elements configured to modulate the light to produce:
an amplitude modulated signal or part of an amplitude modulated signal;
a phase modulated signal or part of a phase modulated signal;
an amplitude and a phase modulated signal or part of an amplitude and a phase modulated signal; or
a quadrature amplitude modulated signal or part of a quadrature amplitude modulated signal.

18. The monolithically integrated optical modulation device of claim 1, wherein at least one branch of the optical waveguide passes from a splitter downstream of the input optical port along a path close to a central axis of the monolithically integrated optical modulation device and returns to the output optical port along a path close to the side edge of the monolithically integrated optical modulation device, and wherein at least one other branch passes from the splitter along another path close to the central axis and returns to another output optical port along a path close to an opposite side edge of the monolithically integrated optical modulation device.

19. The monolithically integrated optical modulation device of claim 1, wherein the at least two branches include an inner branch and an outer branch,
wherein the optical waveguide includes a 180° bend to cause the net 180° change in direction of the light, and
wherein the resistor is positioned between a first segment of the inner branch on a first side of the 180° bend and a second segment of the inner branch on a second side of the 180° bend.

20. A monolithically integrated optical modulation device comprising:
a single substrate including a front edge, a rear edge, and a side edge;
wherein:
an input optical port and an output optical port are disposed on the front edge;
at least one Mach-Zehnder modulator having at least two waveguide branches is provided within the monolithically integrated optical modulation device, the at least two waveguide branches independently undergoing a net 180° change of direction between an input and an output of the Mach-Zehnder modulator;
at least one signal driver electrical input terminal for providing an electrical signal to the Mach-Zehnder modulator is disposed on the rear edge;
at least one direct current (DC) electrical input terminal, disposed on the side edge, that connects to the Mach-Zehnder modulator; and
an on-chip termination unit is coupled to at least one waveguide branch of the at least two waveguide branches,
the on-chip termination unit including a resistor, and
the input optical port, the output optical port, the at least two waveguide branches, the at least one signal driver electrical input terminal, the at least one DC electrical input terminal, and the on-chip termination unit being monolithically integrated on the single substrate.

21. The monolithically integrated optical modulation device of claim 20, wherein the front edge is a facet of the monolithically integrated optical modulation device.

22. A monolithically integrated optical modulation device comprising:
a single substrate including a front edge, a rear edge, and a side edge;
an input optical port positioned on the front edge and an output optical port positioned on the front edge;
an optical waveguide for guiding light from the input optical port to the output optical port,
a portion of the optical waveguide being split into at least two waveguide branches, and
the at least two waveguide branches each undergoing a net 180° change of direction between the input optical port and the output optical port; and
a modulation assembly for imparting an optical signal to light in the optical waveguide;
wherein the modulation assembly comprises:
a modulation element coupled to the optical waveguide;
at least one direct current (DC) electrical input terminal, disposed on the side edge, that connects to the optical waveguide;
at least one electrical input terminal, disposed on the rear edge, for providing a radio frequency (RF) electrical signal to the optical waveguide; and
an on-chip termination unit coupled to the modulation element,
the on-chip termination unit including a resistor, and
the input optical port, the output optical port, the optical waveguide, the modulation element, the at least one DC electrical input terminal, the at least one electrical input terminal, and the on-chip termination unit being monolithically integrated on a same substrate.

23. The monolithically integrated optical modulation device of claim 22, wherein the on-chip termination unit comprises a capacitor, and an electrical path to ground connected in series.

24. The monolithically integrated optical modulation device of claim 23, wherein the electrical path to ground comprises a doped semiconductor and/or a wirebond.

25. A chip comprising a side-by-side array of monolithically integrated optical modulation devices as claimed in claim 22.

26. The chip of claim 25, wherein devices in the side-by-side array are arranged with a side by side spatial frequency of 2.5 mm or less.

27. The chip of claim 25, wherein devices in the side-by-side array are arranged with a side by side spatial frequency of 1 mm or less.

28. A monolithically integrated optical modulation device comprising
a single substrate including a front edge, a rear edge, and a side edge;
wherein an input optical port and an output optical port are disposed on the front edge,
an optical waveguide for guiding light from the input optical port to the output optical port,
a portion of the optical waveguide being split into at least two waveguide branches, and
the at least two waveguide branches each undergoing a net 180° change of direction between the input optical port and the output optical port;
two or more signal driver electrical input terminals are disposed on the rear edge;
at least one direct current (DC) electrical input terminal disposed on the side edge; and
an on-chip termination unit to provide electrical termination, the on-chip termination unit including a resistor, and
the input optical port, the output optical port, the optical waveguide, the two or more signal driver electrical input terminals, the at least one DC electrical input terminal, and the on-chip termination unit being monolithically integrated on the single substrate.

29. The monolithically integrated optical modulation device of claim 28, wherein the front edge is a facet of the monolithically integrated optical modulation device.

* * * * *